(12) United States Patent
Li et al.

(10) Patent No.: US 10,404,109 B2
(45) Date of Patent: Sep. 3, 2019

(54) SINGLE PHASE PERMANENT MAGNET MOTOR AND STATOR CORE

(71) Applicant: JOHNSON ELECTRIC INTERNATIONAL AG, Murten (CH)

(72) Inventors: Yue Li, Hong Kong (CN); Chui You Zhou, Shenzhen (CN); Yong Wang, Shenzhen (CN); Yong Li, Shenzhen (CN)

(73) Assignee: JOHNSON ELECTRIC INTERNATIONAL AG, Murten (CH)

( * ) Notice: Subject to any disclaimer, the term of this patent is extended or adjusted under 35 U.S.C. 154(b) by 2 days.

(21) Appl. No.: 15/254,462

(22) Filed: Sep. 1, 2016

(65) Prior Publication Data

US 2017/0063178 A1    Mar. 2, 2017

(30) Foreign Application Priority Data

Sep. 1, 2015 (CN) .......................... 2015 1 0553336

(51) Int. Cl.
| | |
|---|---|
| *H02K 1/14* | (2006.01) |
| *H02K 1/27* | (2006.01) |
| *H02K 3/18* | (2006.01) |
| *H02K 21/18* | (2006.01) |

(52) U.S. Cl.
CPC ............. *H02K 1/141* (2013.01); *H02K 1/143* (2013.01); *H02K 1/2706* (2013.01); *H02K 1/2733* (2013.01); *H02K 3/18* (2013.01); *H02K 21/185* (2013.01)

(58) Field of Classification Search
CPC ........ H02K 1/27; H02K 11/21; H02K 1/2753; H02K 21/02; H02K 29/03; H02K 29/08; H02K 1/148; H02K 7/04; H02K 1/2773
See application file for complete search history.

(56) References Cited

U.S. PATENT DOCUMENTS

| | | | |
|---|---|---|---|
| 6,012,217 A * | 1/2000 | Kliman et al. .................. | 29/596 |
| 8,519,589 B2 * | 8/2013 | Sasaki ..................... | F04B 35/04 310/172 |
| 2008/0303369 A1* | 12/2008 | Ionel et al. ................... | 310/172 |
| 2015/0042194 A1* | 2/2015 | Li et al. .................. | 310/156.01 |

* cited by examiner

*Primary Examiner* — Naishadah N Desai
(74) *Attorney, Agent, or Firm* — Muncy, Geissler, Olds & Lowe, P.C.

(57) ABSTRACT

A stator core includes an end portion, a first pole arm, and a second pole arm. The first pole arm includes two first connecting arms extending from the end portion and spaced from each other, and two first pole claws respectively formed at ends of the first connecting arms. The first pole claws are spaced from each other with an opening formed there between. The second pole arm includes two second connecting arms axially stacked to the two first connecting arms respectively and two second pole claws respectively formed at distal ends of the two second connecting arms. The two second connecting arms are connected with each other.

14 Claims, 6 Drawing Sheets

SINGLE PHASE PERMANENT MAGNET MOTOR AND STATOR CORE

CROSS REFERENCE TO RELATED APPLICATIONS

This non-provisional patent application claims priority under 35 U.S.C. § 119(a) from Patent Application No. 201510553336.5 filed in The People's Republic of China on 1 Sep. 2015.

FIELD OF THE INVENTION

The present invention relates to single phase motors, and in particular to a stator core of a single phase permanent magnet motor.

BACKGROUND OF THE INVENTION

A single phase permanent magnet motor usually consists of a stator core, stator windings, and a permanent magnet rotor. The stator core is generally U-shaped, including two spaced pole arms. A pole claw is formed at a distal end of each pole arm. An inner wall surface of each pole claw is inwardly recessed to form an arc pole surface. The windings are wound around the pole arms. The rotor is disposed between the two pole claws and confronts the arc pole surface. In this type of motor, the pole arms of the stator core are separated apart, with large openings formed between the two pole claws. The openings lead to a large cogging torque formed between the stator and the rotor, thus making the motor operation unstable and causing noise.

SUMMARY OF THE INVENTION

Thus, there is a desire for a single phase permanent magnet motor and a stator core thereof that can effectively improve the stability of the motor operation and reduce the noise.

In one aspect, a stator core is provided which includes an end portion, a first pole arm, and a second pole arm. The first pole arm includes two first connecting arms extending from the end portion and spaced from each other, and two first pole claws respectively formed at ends of the first connecting arms. The first pole claws are spaced from each other with an opening formed there between. The second pole arm includes two second connecting arms axially stacked to the two first connecting arms respectively and two second pole claws respectively formed at distal ends of the two second connecting arms. The two second connecting claws are connected with each other.

Preferably, a width of the opening is less than a distance between the connecting arms.

Preferably, each first pole claw extends laterally from the first connecting arm toward the other pole claw to form a wall portion, and the wall portions of the two first pole claws form the opening there between.

Preferably, the second pole claws form a wall portion connecting the two second connecting arms, and a magnetic bridge is formed at a middle of the wall portion of the second pole claws.

Preferably, the magnetic bridge is axially aligned with the opening.

Preferably, an outer wall surface of the magnetic bridge is formed with grooves.

Preferably, the stator core comprises a plurality of said first pole arms and a plurality of said second pole arms alternatively stacked along the axial direction.

Preferably, the stator core comprises one said first pole arm and two said second pole arms, and said first pole arm is sandwiched between said two second pole arms.

Preferably, the stator core comprises two said first pole arms and one said second pole arm, and said second pole arm is sandwiched between said first pole arms.

Preferably, each of the end portion, the first pole arm and the second pole arm is formed by stacking a plurality of laminations and are mechanically connected with each other; one of the first pole arm and the end portion forms a locking groove, and the other of the first pole arm and the end portion forms a locking block; one of the second pole arm and the end portion forms a locking groove, and the other of the second pole arm and the end portion forms a locking block; each locking block is engaged in one corresponding locking groove to interconnect the first pole arm, the second pole arm and the end portion.

Preferably, the arc pole surface is inwardly recessed to form two startup grooves, and the two startup grooves are offset from a central axis of the pole claws and are spaced 180 degrees along the circumferential direction.

In another aspect, the present invention provides a single phase permanent magnet motor including a stator core, windings wound around the stator core, and a permanent magnet rotor rotatable relative to a stator. The stator core has an end portion, a first pole arm, and a second pole arm. The first pole arm includes two first connecting arms extending from the end portion and spaced from each other, and two first pole claws respectively formed at ends of the first connecting arms. The first pole claws are spaced from each other with an opening formed there between. The second pole arm includes two second connecting arms axially stacked to the two first connecting arms respectively and two second pole claws respectively formed at distal ends of the two second connecting arms. The two second connecting arms are connected with each other.

Preferably, a circumferential width of the opening is less than four times of a width of the air gap between the arc pole surface and the rotor.

Preferably, a circumferential width of the opening is less than two times of a width of the air gap between the arc pole surface and the rotor.

DETAILED DESCRIPTION OF THE PREFERRED EMBODIMENTS

Figure 1:
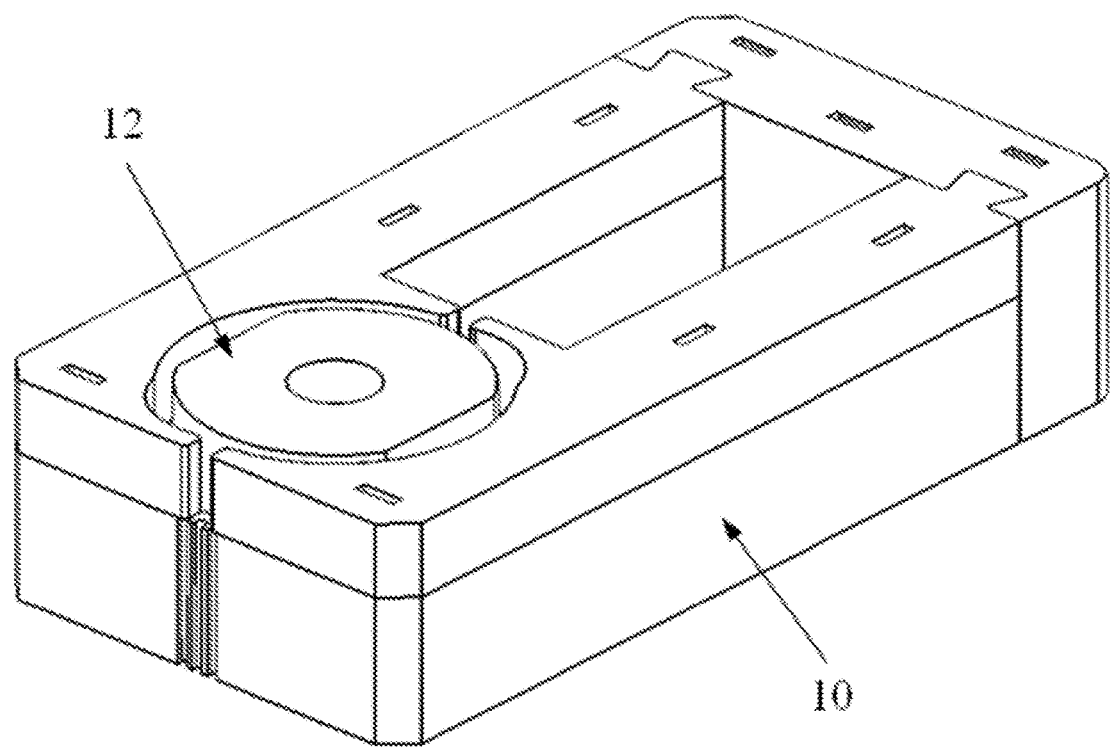
FIG. 1 illustrates a single phase permanent magnet motor according to one embodiment of the present invention.

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

Figure 2:
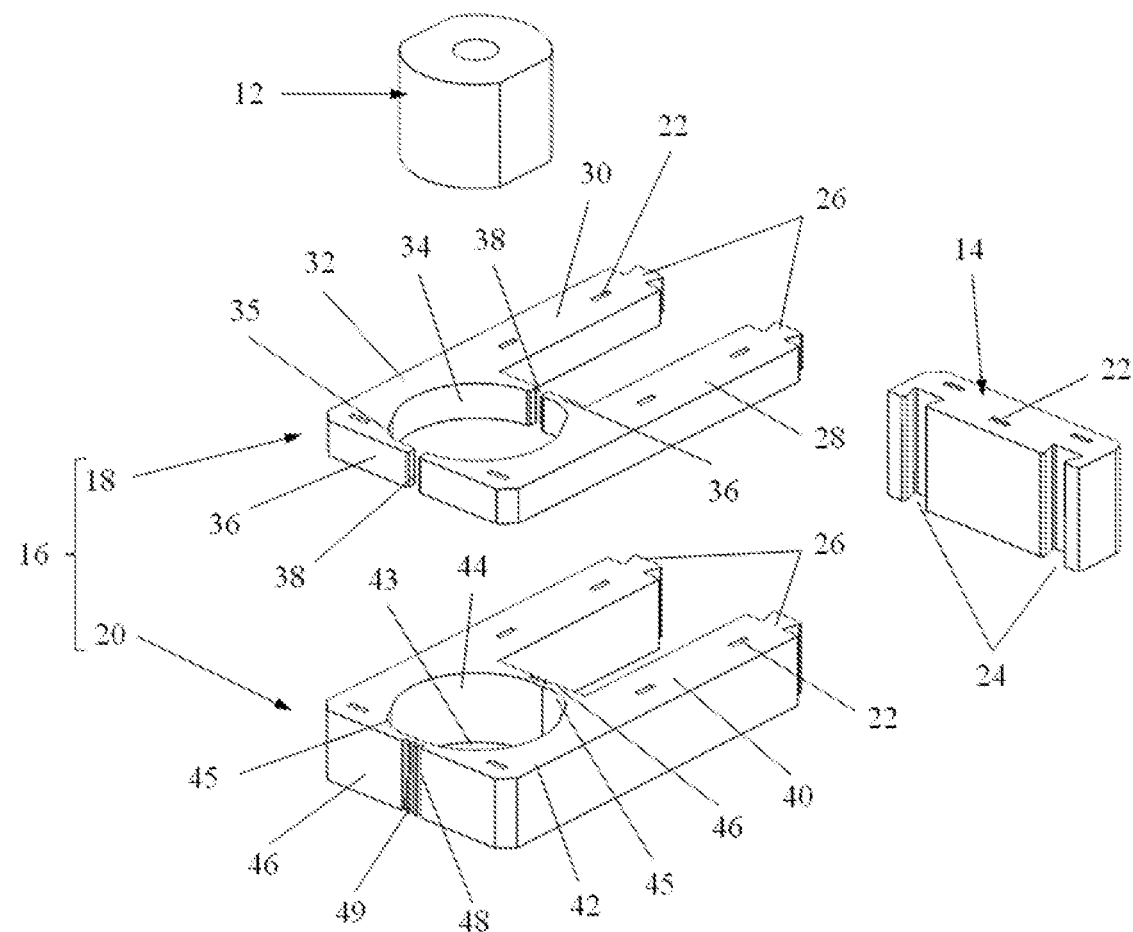
FIG. 2 is an exploded view of the motor of FIG. 1.

FIG. 1 and FIG. 2 illustrate a single phase permanent magnet motor according to one embodiment of the present invention. The motor includes a stator core 10, windings (not shown) wound around the stator core 10, and a permanent magnet rotor 12 rotatably disposed in the stator core 10. In the figures, for the sake of clearly showing the structure and features of the stator core 10 of the motor of the present invention, some parts of the motor, such as the windings, a control circuit for controlling the current of the windings, a motor housing or the like, are not shown, which can be constructed as in a known single phase permanent magnet motor. A rotary shaft may fixedly pass through the permanent magnet rotor 12 for connecting with a load. Upon the windings being energized, the stator core 10 is polarized which interacts with the magnetic field of the permanent magnet rotor 12 to push the permanent magnet rotor 12 to rotate, which in turn drives the load to operation.

The stator core 10 may be made from a soft magnetic material such as ferrite. Preferably, in the present embodiment, the stator core 10 is a U-shaped stator core including an end portion 14 and a pole arm 16 perpendicularly extending outwardly from the end portion 14. In this embodiment, the pole arm 16 includes at least a first pole arm 18 and a second pole arm 20. The first pole arm 18 and the second pole arm 20 are stacked with each other in an axial direction of the rotor 12 and are connected to the same side of the end portion 14. In this embodiment, the end portion 14, the first pole arm 18 and the second pole arm 20 are separately formed and then are connected together through mechanical connections. As such, the winding process can be completed before the first pole arm 18 and the second pole arm 20 are connected to the end portion 14, which makes the winding process easier and more convenient.

Preferably, each of the end portion 14, first pole arm 18 and second pole arm 20 is made by stacking a plurality of laminations such as silicon steel sheets. The figures only show the overall shapes of the end portion 14, first pole arm 18 and second pole arm 20 after the laminations are stacked, without showing specific structures of the multiple stacked layers. For facilitating the assembly of the laminations, each lamination is formed with a corresponding assembly hole 22. In this embodiment, the assembly hole 22 is a recessed blind hole and the lamination has a protrusion corresponding to the blind hole. During stacking the laminations, the protrusion of one lamination is engaged in the assembly hole of an adjacent lamination so as to form a mechanical connection there between. The end portion 14, the first pole arm 18 and the second pole arm 20 are respectively formed by the methods.

In this embodiment, the end portion 14 forms two locking grooves 24 at locations adjacent two sides thereof. The locking grooves 24 extend through the end portion 14 along the axial direction. The pole arm 16 including the first pole arm 18 and the second pole arm 20 forms locking blocks 26 corresponding to the locking grooves 24. The locking blocks 26 is inserted into the locking grooves 24 along the axial direction to connect the pole arm 16 with the end portion 14, thus forming the stator core 10. Preferably, the locking block 26 is dovetail shaped and the locking groove 24 has a shape matching the locking block 26, so that the connection between the locking block 26 and the locking groove 24 is strengthened, to avoid disengagement there between. In another embodiment, the locking grooves 24 may be formed in the first pole arm 18 and the second pole arm 20, the locking blocks 26 are correspondingly formed on the end portion 14, and the end portion 14, the first pole arm 18 and the second pole arm are connected together to form the stator core 10.

The first pole arm 18 includes two separate arm portions 28. The two arm portions 28 have substantially the same construction and, are spaced apart and disposed in parallel with each other. Each arm portion 28 is elongated, including a first connecting arm 30 and a first pole claw 32 formed at a distal end of the first connecting arm 30 away from the end portion 14. An end face of the other distal end of the first connecting arm 30 facing the end portion 14 projects outwardly to form the locking block 26 for connecting with the locking groove 24 of the end portion 14. The first pole claws 32 of the two arm portions 28 are opposed to and spaced from each other, and cooperatively define a receiving space for receiving the rotor 12 there between. Opposed inner wall surfaces of the two first pole claws 32 are recessed to form a first arc pole surface 34. The first arc pole surface 34 confronts and is spaced from an outer surface of the rotor 12, with an air gap formed between the first arc pole surface 34 and the rotor 12.

In this embodiment, each first pole claw 32 is generally C-shaped, with two circumferential sides project laterally outwardly relative to the first connecting arm 30 to form two first wall portions 36. The first wall portion 36 is generally parallel to the end portion 14 and disposed in a spacing between the two first connecting arms 30. Preferably, an extending length of the first wall portion 36 is less than a half of the spacing between the two first connecting arms 30. As such, after the arm portions 28 are joined, the two first wall portions 36 at inner sides (i.e. the sides closer to the end portion 14) of the two first pole claws 32 are opposed to each other, with an opening 38 formed between distal ends there of; the two first wall portions 36 at outer sides (i.e. the sides farther to the end portion 14) of the two first pole claws 32 are opposed to each other, with an opening 38 formed between distal ends there of. Preferably, the opening 38 is located at a middle of the spacing between the two first connecting arms 30. The opening 38 has a width less than four times, preferably two times, of the air gap between the stator and the rotor 12 and far less than the spacing between the two first connecting arms 30.

Because the two first pole claws 32 of the first pole arm 18 are separated apart, the first arc pole surface 34 is discontinuous in a circumferential direction to effectively avoid magnetic leakage. In addition, because the two sides of the first pole claw 32 form the first wall portions 36, the width of the discontinuity in the first arc pole surface in the circumferential direction, i.e. the circumferential width of the opening 38 is far less than the spacing between the first connecting arms 30. As such, although the first arc pole surface 34 is discontinuous in the circumferential direction, the width of the discontinuity is small, which leads to small magnetic leakage or even no magnetic leakage, thereby ensuring the motor efficiency and, to a great extent, reducing the cogging torque and hence ensuring the stable rotation of the rotor 12.

Preferably, the width of the discontinuity in the first arc pole surface 34 along the circumferential direction, i.e. the width of the opening 38, is substantially two times of the width of the air gap between the first arc pole surface 34 and the rotor 12. In addition, the two openings 38 may have different widths, i.e. the first arc pole surface 34 can be discontinued at different locations along the circumferential direction with different width. In this embodiment, a minimum width of the discontinuity in the first arc pole surface is about two times of the width of the air gap between the first arc pole surface 34 and the rotor 12, which can reduce the cogging torque while reducing the magnetic leakage as much as possible.

Preferably, an inwardly-recessed startup groove 35 is formed in the first arc pole surface 34. The startup groove 35 is offset from a central axis X (FIG. 3) of the first pole claw 32 by an angle. In this embodiment, there are two startup grooves 35 located on the two first pole claws 32, respectively. One of the first startup grooves 35 is located adjacent to the inner side wall portion 36 of a corresponding first pole claw 32; the other startup groove 35 is located adjacent to the outer side wall portion 36 of a corresponding first pole claw 32. The two startup grooves 35 are spaced 180 degrees from each other along the circumferential direction The presence of the startup grooves 35 makes the air gap between the first arc pole surface 34 and the rotor 12 uneven, such that when the motor is powered off and stops rotation, a pole axis of the rotor 12, i.e., an axis passing through the centers of the magnetic poles, is offset from the central axis X of the first pole claw 32 by an angle, such that the rotor is avoided from stopping at a dead point, thereby ensuring that the motor can be successfully started upon being energized.

In this embodiment, the second pole arm 20 is generally U-shaped, including two second connecting arms 40 and two second pole claws 42 formed at distal ends of the two second connecting arms 40. The two second connecting arms 40 are spaced from and disposed in parallel with each other. An end face of each second connecting arm 40 projects outwardly to form one locking block 26 for connecting with the locking groove 24 of the end portion 14. The two pole claws 42 are disposed away from the end portion 14 and connected together. A circular hole 43 is defined in a center of the connected pole claws 42, for receiving the rotor 12. A diameter of the circular hole 43 is slightly greater than an outer diameter of the rotor 12. In this embodiment, the circular hole 43 extends through the second pole claws 42 along the axial direction, with a closed circumference around the circular hole 43.

The second pole claws 42 surround the circular hole 43 and form a second arc pole surface 44 confronting the rotor 12. The second arc pole surface 44 is a continuous arc surface along the circumferential direction. Preferably, the second arc pole surface 44 of the two second pole claws 40 cooperatively form a substantially standard cylindrical surface which is coaxial with the rotor 12 with a continuous and substantially even air gap formed there between.

The two second arc pole surfaces 44 are recessed inwardly to form two second startup grooves 45. The two startup grooves 45 are offset from a central axis Y of the second pole claw 32 by an angle and are spaced 180 degrees from each other along the circumferential direction. Preferably, each second startup groove 45 is aligned with one corresponding first startup groove 35 in the axial direction. The air gap between the second arc pole surface 44 of the second pole claws 42 and the rotor 12 is uneven at the areas of the second startup grooves 45, such that when the motor is powered off and stops rotation, the pole axis of the rotor 12 is offset from the central axis Y of the second pole claw 42 by an angle, such that the rotor is avoided from stopping at a dead point, thereby ensuring that the motor can be successfully started upon being energized.

Different from the first pole claws 32 of the first pole arm 18, the second pole claws 42 of the second pole arm 20 are connected together to form a closed ring structure, with second wall portions 46 formed between the two second connecting arms 40. The second wall portions 46, the second connecting arms 38 and the end portion 14 are connected one by one to form a magnetic path not passing through the rotor 12, which to some extent causes magnetic leakage and hence reduces the power density of the motor. However, after assembled with the rotor 12, the second arc pole surface 44 of the second pole arm 20 and the outer wall surface of the rotor 12 form there between the continuous air gap which effectively reduces the cogging torque. This makes the rotor 12 rotation more smooth and reduces the noise during motor operation. In this embodiment, because the second arc pole surface is a cylindrical surface, a radial distance between the second arc pole surface and the outer wall surface of the rotor 12 is constant. Therefore, the even air gap is formed between the second arc pole surface and the outer wall surface of the rotor 12 except at the areas of the startup grooves 45, which can maximally reduce the cogging torque and the noise during operation of the motor.

Preferably, a magnetic bridge 48 is formed at a middle of each second wall portion 46. The magnetic bridge 48 has a radial width less than the remaining portion of the second wall portion 46 to reduce the magnetic leakage. The magnetic bridge 48 corresponds to a middle of the spacing between the two second connecting arms 40, and the second startup grooves 45 are located adjacent the magnetic bridges 48. Preferably, At least one groove 49 is formed in an outer wall surface of second wall portion 46 corresponding to the magnetic bridge 48. The at least one groove 49 extends axially and may be arc- or square-shaped viewed from an axial direction. In this embodiment, the number of the grooves 49 is three, and their cross section is a semi-circular. A circumferential width of the magnetic bridge 48 is greater than the width of the opening 38.

Figure 3:
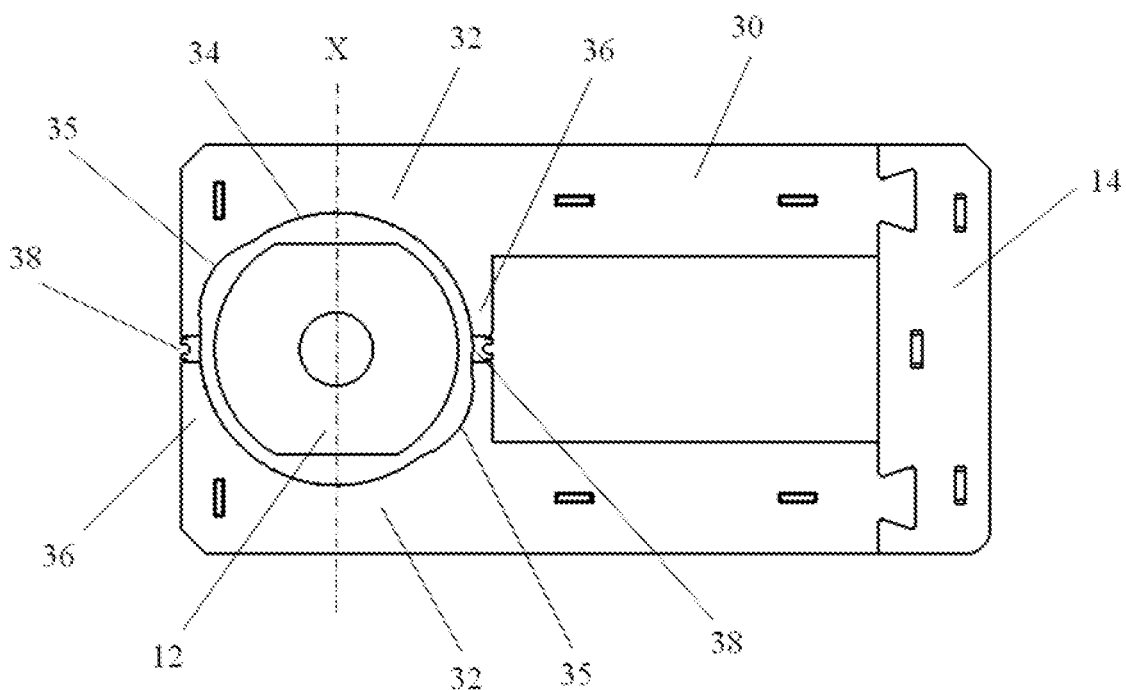
FIG. 3 is a top view of the motor of FIG. 1.
Figure 4:
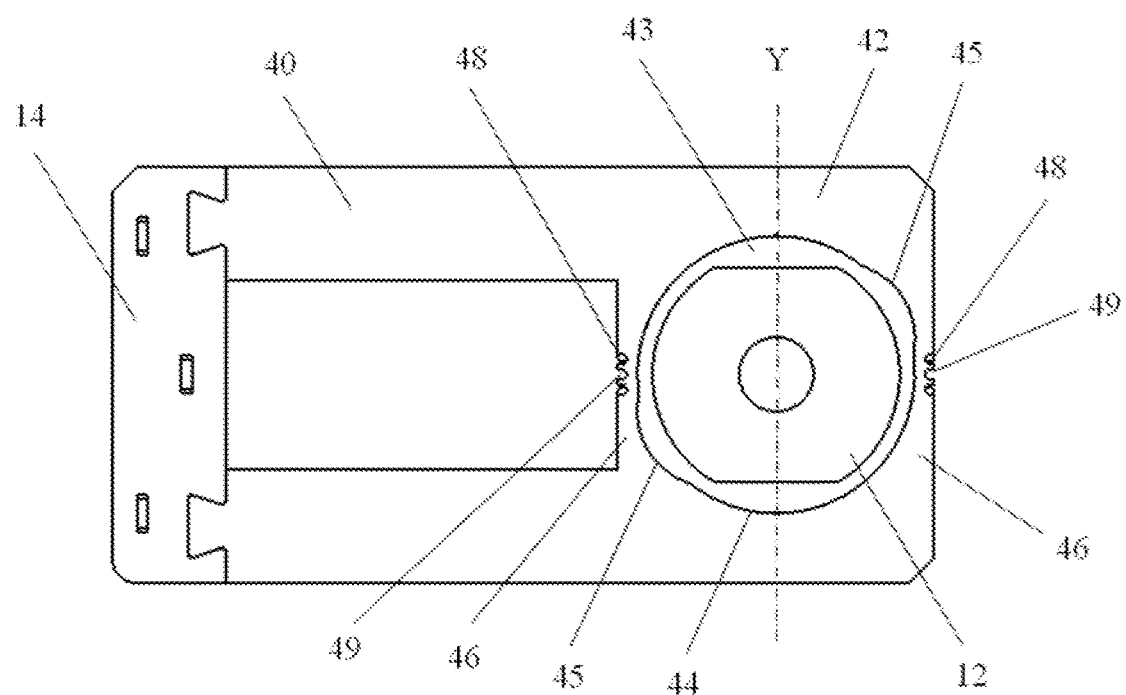
FIG. 4 is a bottom view of the motor of FIG. 1.

Referring to FIG. 3 and FIG. 4, the first pole arm 18 and the second pole arm 20 are stacked in the axial direction of the rotor 12, with each first connecting arm 30 stacked on one corresponding second connecting arm 40 to cooperatively from one connecting arm of the pole arm 16. In this embodiment, the two connecting arms of the pole arm 16 are spaced from and disposed in parallel with each other, with a winding space formed there between. The windings are wound around the two connecting arms. There are typically two windings connected in series. Each of the two first pole claws 32 is stacked with one second pole claw 42 to cooperatively form one pole claw of the pole arm 16 for interacting with the rotor 12. The opening 38 of the first pole claw 32 is aligned with the magnetic bridge 48 of the second pole claw 42 in the axial direction. The first arc pole surface 34 and the second arc pole surface 44 are substantially coaxial, have substantially the same diameter, and cooperatively form an arc pole surface of the pole arm 16. The first startup grooves 35 on the first arc pole surface 34 and the second startup grooves 45 on the second arc pole surface 44 are aligned in the axial direction. The axially aligned startup grooves 35, 45 have the same shape, and cooperatively form the startup grooves of the arc pole surface.

For the motor of the present invention, the pole arm 16 of the stator core 10 is formed by the first pole arm 18 and the second pole arm 20 stacked with each other. Thus the arc pole surface has a first axial portion continuous in circumferential direction, and a second axial portion discontinuous along the circumferential direction. The continuous portion is the second arc pole surface 44 and the discontinuous portion is the first arc pole surface 34. As such, the first pole arm 18 and the second pole arm 20 cooperate to gain a balance between efficiency and noise—the two important performances, thereby enhancing the overall performance of the motor.

In addition, the arc pole surface and the rotor 12 form an uneven air gap at the area of the startup groove, and form an even air gap at the area without the startup groove, which ensures the successful startup of the rotor. In the above embodiment, the startup grooves 35, 45 are formed in the first and second arc pole surfaces 34, 44. In some embodiments, the startup grooves 36 can be formed only in the first arc pole surface 34 or the second arc pole surface 44. It should be understood that a driving circuit may be designed to suit particular requirements on the startup direction of the motor. In addition, the startup groove 36 may be modified in various length and depth to meet different requirements and should not be limited to the particular constructions as illustrated.

Figure 5:
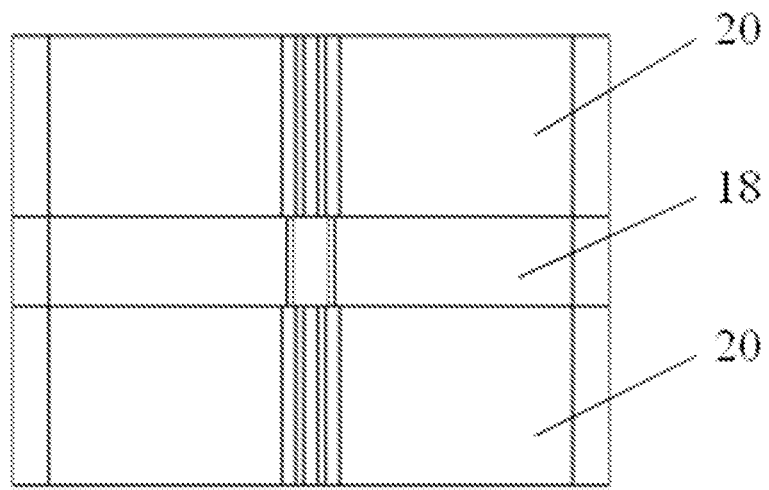
FIG. 5 illustrates a stator core of a single phase permanent magnet motor according to a second embodiment.
Figure 6:
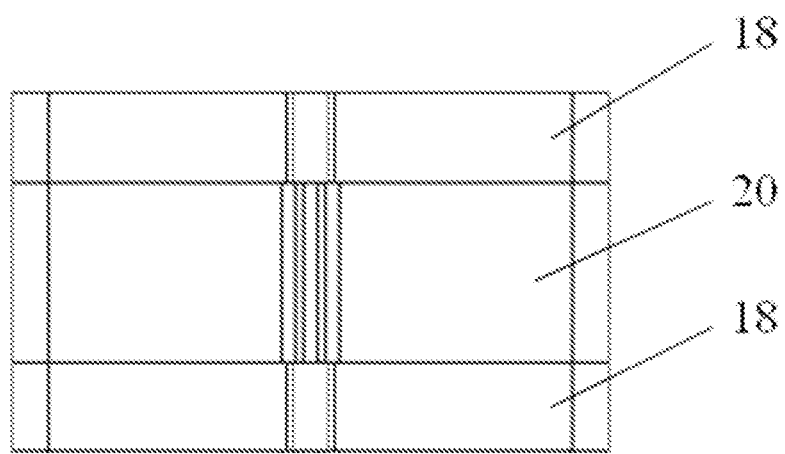
FIG. 6 illustrates a stator core of a single phase permanent magnet motor according to a third embodiment.

In the above embodiment, a single first pole arm 18 is combined with a single second pole arm 20 to form the stator core 10. In some other embodiments, the first pole arm 18 and second pole arm 20 may be combined in different patterns. Referring to FIG. 5, a single first pole arm 18 may be combined with two second pole arms 20, with the first pole arm 18 sandwiched between the two second pole arms 20. Alternatively, referring to FIG. 6, a single second pole arm 20 may be combined two first pole arms 18, with the second pole arm 20 sandwiched between the two first pole arms 18. In another alternative embodiment, multiple first pole arms 18 and multiple second pole arms 20 are alternatively stacked.

Although the invention is described with reference to one or more preferred embodiments, it should be appreciated by those skilled in the art that various modifications are possible. Therefore, the scope of the invention is to be determined by reference to the claims that follow.

The invention claimed is:

1. A stator core comprising:
   an end portion;
   a first pole arm comprising at least a first lamination having two first connecting arms extending from the end portion and spaced from each other, and two first pole claws respectively formed at ends of the first connecting arms, the first pole claws being spaced from each other with an opening formed there between; and
   a second pole arm comprising a second lamination stack consisting of more than one lamination stacked axially below said at least first lamination two second connecting arms axially stacked to the two first connecting arms respectively and two second pole claws respectively formed at distal ends of the two second connecting arms, the two second connecting claws being connected with each other said stator core being devoid of any other lamination.

2. The stator core of claim 1, wherein a width of the opening is less than a distance between the first connecting arms.

3. The stator core of claim 2, wherein each first pole claw extends laterally from the first connecting arm toward the other pole claw to form a wall portion, and the wall portions of the two first pole claws form the opening there between.

4. The stator core of claim 1, wherein the second pole claws form a wall portion connecting the two second connecting arms, and a magnetic bridge is formed at a middle of the wall portion of the second pole claws.

5. The stator core of claim 4, wherein the magnetic bridge is axially aligned with the opening.

6. The stator core of claim 4, wherein an outer wall surface of the magnetic bridge is formed with grooves.

7. The stator core of claim 1, comprising a plurality of said first pole arms and a plurality of said second pole arms alternatively stacked along the axial direction.

8. The stator core of claim 1, comprising one said first pole arm and two said second pole arms, and said first pole arm is sandwiched between said two second pole arms.

9. The stator core of claim 1, comprising two said first pole arms and one said second pole arm, and said second pole arm is sandwiched between said first pole arm.

10. The stator core of claim 1, wherein each of the end portion, the first pole arm and the second pole arm is formed by stacking a plurality of laminations and are mechanically connected with each other; one of the first pole arm and the end portion forms a locking groove, and the other of the first pole arm and the end portion forms a locking block; one of the second pole arm and the end portion forms a locking groove, and the other of the second pole arm and the end portion forms a locking block; each locking block is engaged in one corresponding locking groove to interconnect the first pole arm, the second pole arm and the end portion.

11. The stator core of claim 1, wherein the arc pole surface is inwardly recessed to form two startup grooves, and the two startup grooves are offset from a central axis of the pole claws and are spaced 180 degrees along the circumferential direction.

12. A single phase permanent magnet motor comprising:
   a stator core according to claim 1, the stator core forming an arc pole surface:
   windings wound around the stator core, and
   a permanent magnet rotor rotatably disposed in the stator core, the arc pole surface of the stator core surrounding the rotor with an air gap formed between the arc pole surface and the rotor.

13. The single phase permanent magnet motor of claim 12, wherein a circumferential width of the opening is less than four times of a width of the air gap between the arc pole surface and the rotor.

14. The single phase permanent magnet motor of claim 12, wherein a circumferential width of the opening is less than two times of a width of the air gap between the arc pole surface and the rotor.

* * * * *